United States Patent
Graham

(10) Patent No.: US 6,695,522 B1
(45) Date of Patent: Feb. 24, 2004

(54) LOW TO MEDIUM PRESSURE HIGH TEMPERATURE ALL-CERAMIC AIR TO AIR INDIRECT HEAT EXCHANGERS WITH NOVEL BALL JOINTS AND ASSEMBLIES

(76) Inventor: Robert G. Graham, 6027 E. Grand Lake Rd., Presque Isle, MI (US) 49777

( * ) Notice: Subject to any disclaimer, the term of this patent is extended or adjusted under 35 U.S.C. 154(b) by 0 days.

(21) Appl. No.: 09/815,220

(22) Filed: Mar. 22, 2001

Related U.S. Application Data

(60) Division of application No. 09/385,602, filed on Aug. 3, 1999, now Pat. No. 6,206,603, which is a division of application No. 09/221,792, filed on Dec. 28, 1997, now Pat. No. 5,979,543, which is a continuation-in-part of application No. 08/548,575, filed on Oct. 26, 1995, now abandoned.

(51) Int. Cl.[7] ................................................. F16L 9/10
(52) U.S. Cl. ..................................................... 403/135
(58) Field of Search ................................ 403/135, 122, 403/345, 365, 366, 367

(56) References Cited

U.S. PATENT DOCUMENTS

| | | |
|---|---|---|
| 1,429,149 A | 9/1922 | Lawrence |
| 1,974,402 A | 9/1934 | Templeton |
| 3,019,000 A | 1/1962 | Bork |
| 3,675,710 A | 7/1972 | Ristow |
| 3,923,314 A | 12/1975 | Lawler et al. |
| 4,015,636 A * | 4/1977 | Van Fossen ................. 138/149 |
| 4,018,209 A | 4/1977 | Bonvicini |
| 4,106,556 A | 8/1978 | Heyn et al. |
| 4,122,894 A | 10/1978 | Laws et al. |
| 4,449,575 A | 5/1984 | Laws et al. |
| 4,618,173 A * | 10/1986 | Dopyera et al. ............ 285/261 |
| 4,632,181 A | 12/1986 | Graham |
| 5,856,015 A * | 1/1999 | Buchanan .................... 428/426 |

FOREIGN PATENT DOCUMENTS

GB 2015146 9/1979

OTHER PUBLICATIONS

Flexible Ball Joint system Strategin Alliance, Sonic Environmental Systems.

* cited by examiner

*Primary Examiner*—John R. Cottingham
(74) *Attorney, Agent, or Firm*—McKellar Stevens; Robert L. McKellar

(57) ABSTRACT

What is disclosed herein deals with low to medium pressure, high temperature, all ceramic, air-to-air, indirect heat exchangers, novel ball joints; connecting slip ring collars for ceramic tubes, that are useful in such heat exchangers, systems comprising several heat exchangers or systems comprising heat exchangers that are fabricated such that they provide more efficient heat exchangers than has been possible heretofore.

3 Claims, 5 Drawing Sheets

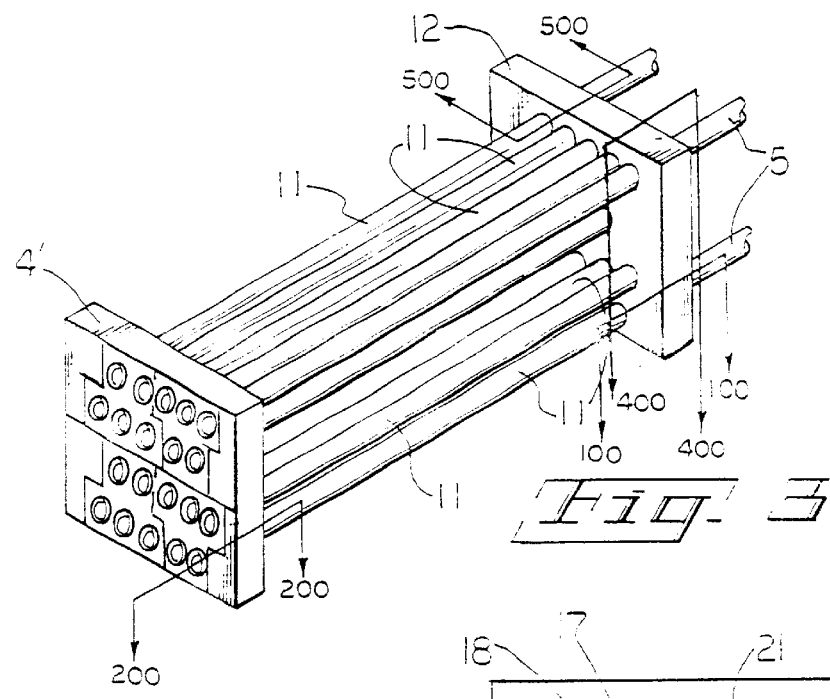
Fig. 3
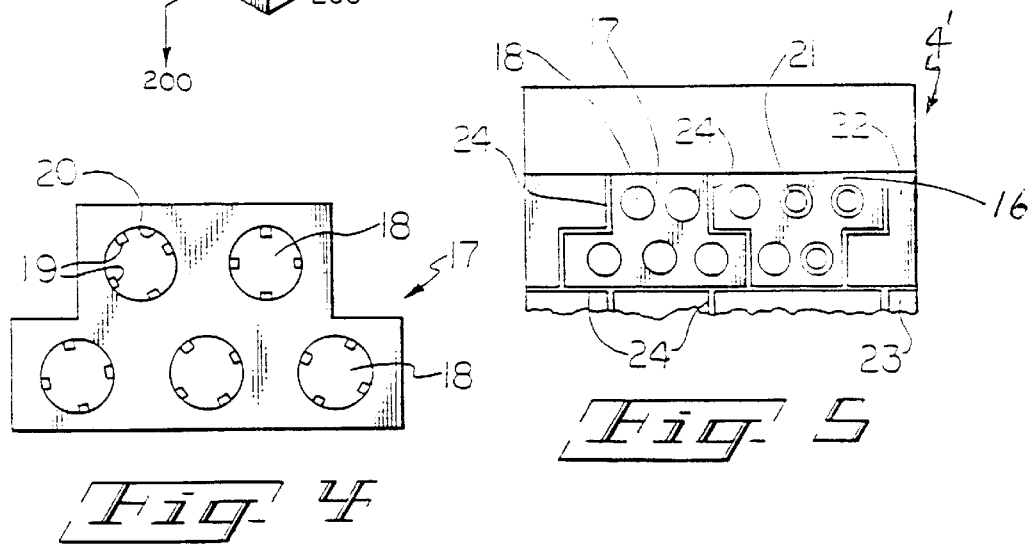
Fig. 4
Fig. 5

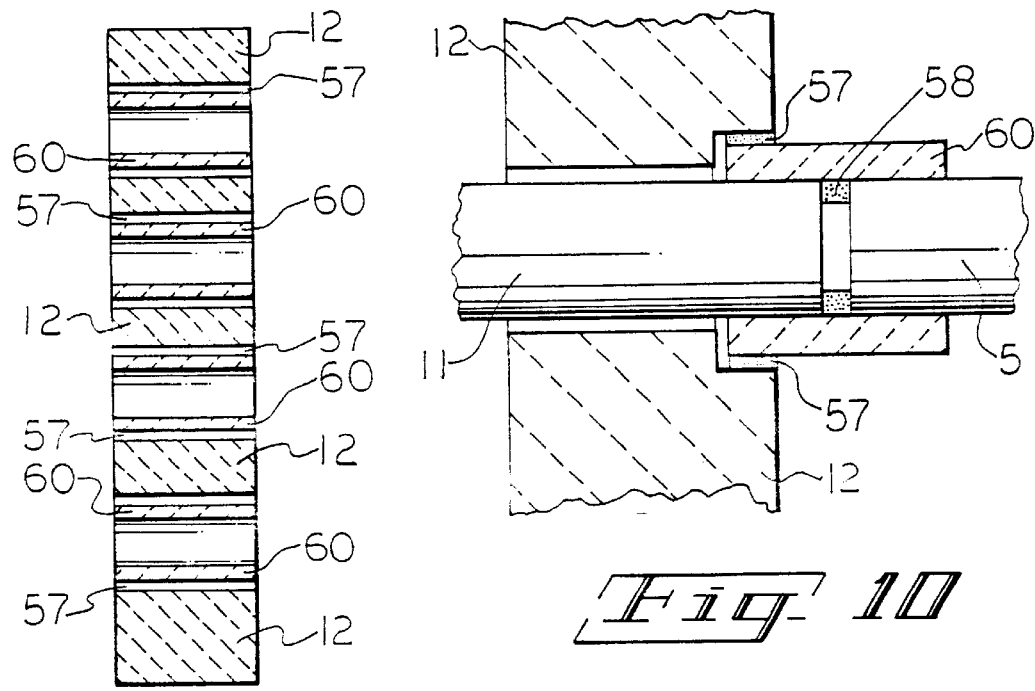
Fig. 9
Fig. 10
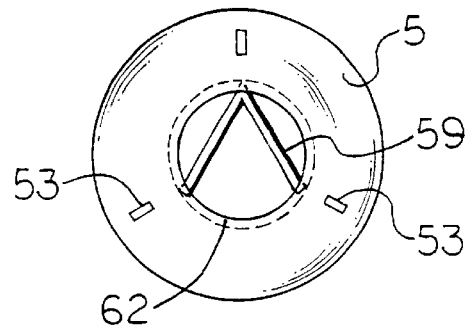
Fig. 11

LOW TO MEDIUM PRESSURE HIGH TEMPERATURE ALL-CERAMIC AIR TO AIR INDIRECT HEAT EXCHANGERS WITH NOVEL BALL JOINTS AND ASSEMBLIES

This application is a divisional application of Ser. No. 09/385,602, filed Aug. 3, 1999, issued as U.S. Pat. No. 6,206,603 on Mar. 27, 2001, which is a divisional application of Ser. No. 09/221,792, which was filed Dec. 28, 1997, issued as U.S. Pat. No. 5,979,543, on Nov. 9, 1999, which is a continuation-in-part of U.S. Ser. No. 08/548,575, filed on Oct. 26, 1995, which is abandoned.

The invention disclosed and claimed herein deals with low to medium pressure, high temperature, all ceramic, air-to-air, indirect heat exchangers, novel ball joints, high load-bearing ceramic tube sheets, and connecting slip ring collars for ceramic tubes that are useful in such heat exchangers. Systems utilizing several heat exchangers or systems comprising heat exchangers are fabricated such that they provide more efficient heat transfer than has been possible heretofore.

The heat exchangers of this invention are not merely modified standard heat exchangers that are in use today, but are new and novel heat exchangers which require half the number of tube sheets of standard heat exchangers and which have outstanding efficiencies in operation, among other valuable benefits. Further, they have reduced tube to seal and tube sheet to shell leakage by a significant amount by use of the novel connector slip ring collars; novel ball joint assemblies and dense, interlocked, refractory tube sheets. The novel heat exchangers of this invention also reduce the tube to tube sheet leakage by a significant factor and reduce the tube sheet to tube shell leakage by a significant factor. The heat exchangers of this invention do not require air cooled tube sheets as does the prior art heat exchangers because of the novel low-heat conductive refractory shapes between the tube sheets and the shell of the heat exchanger. The entire manufacturing and assembly cost for tube sheets and tubes for these heat exchangers is reduced by over fifty percent as compared to the cost of manufacturing and assembly of the prior art heat exchangers. Further, the heat exchangers of the present invention do not lose any ability to replace individual tubes, nor do they lose the ability to use standard ceramic tubes.

Thus, it is one object of this invention to provide heat exchangers having the advantage of significantly reduced leakage of air. This reduced leakage allows for usage of higher pressures and essentially prevents mixing of dirty air with clean air during the operation of the heat exchangers.

It is yet another advantage of this invention to provide heat exchangers having the benefits of reduced cost of manufacturing and assembly, and it is still another object of this invention to provide heat exchangers which can be used with low to medium pressures and high temperatures where required.

BACKGROUND OF THE INVENTION

Indirect, air-to-air heat exchangers are devices that are used to extract thermal energy from dirty heated gas and provide that thermal energy to a wide variety of diverse application such as heating clean ambient air, liquids, chemical processes, and similar uses. The source from which the extraction is made is usually waste gas of some kind, such as hot waste fumes from an industrial furnace or the like.

In general, conventional shell and tube heat exchangers utilize a series of tubes supported at their ends by what is known in the art as tube sheets. Ambient air flows through, or is forced through the tubes, and a cross flow of the hot gases, usually waste gases, is passed in a cross flow over the outside surface of the tubes to heat the air flowing through them. This is the concept of "heat exchange". It will be noted that the applicant contemplates that the cross flow can be air and the material flowing through the ceramic tubes can be hot or waste gases.

Some conventional types of heat exchangers employ metal tubes which are welded at their ends to a supporting metal tube sheet. These metal heat exchangers are subject to deterioration from chemically corrosive or abrasive particles and further, they are subject to wide latitudes of expansion under operating conditions.

Conventional heat exchangers employing ceramic components have been used in the past in these types of adverse environments. One type of heat exchanger in this category employs a sponge or matrix made of ceramic material. The particulates in the waste fumes have a tendency to plug the matrix after a period of time thereby decreasing the efficiency and, in some instances, creating a fire hazard.

Yet another type of heat exchanger employs metallic springs pushing against one end of the ceramic tube or tube sheet in an effort to provide sealing engagement between the tube and the supporting tube sheet. Systems employing metal components to seal ceramics are subject to leakage problems since metal has a different rate of expansion than ceramic. In addition, the metallic components are still subject to deterioration under the above-mentioned adverse conditions in which these types of heat exchangers may be used. Also, in the likely event of power failure, the metallic components will fail when air side cooling stops.

Most of the known heat exchanger designs employ straight sided tubes which empty into plenums formed between the supporting tube sheets and the inner wall of the external housing or casing. The plenums are designed to carry the ambient air to other zones in the internal heat exchanger construction employing another set of tubes for passing the air back through the central chamber through which the heated waste fumes flow. Thus, the heat exchangers are normally stacked or otherwise fastened together to increase the operating flow length of both the ambient air and the waste gas and the flow of the ambient air between the plenums and tubes creates a pressure loss within the system. These pressure losses must be overcome by an increase in the horsepower of the fans for moving the ambient air in order to maintain a given velocity of the ambient air flow. These pressure losses also make it difficult to operate at high pressures, and consequently, the heat exchangers of the prior art are not operated at the higher pressures, or if attempts are made to do so, there is severe leakage. These pressure losses also make it difficult to maintain an air tight seal from the ambient air side to the gas side subsystem. The resultant leakage which may occur not only decreases the flow of the ambient air, but also allows air to flow into the fumes to reduce overall heat transfer efficiency. Also, there is an acute operating temperature loss in the heat exchanger with this type of arrangement. Air Side temperatures at operation of the prior art heat exchangers range from about 800° F. to about 1200° F., while the temperatures permitted by the use of the heat exchanger of the instant invention can range from 800° F. to 2400° F. Further, the pressures at operation of the prior art heat exchangers range from 0.25 psig to 250 psig, while the pressures permitted by the use of the heat exchanger of the instant invention can range from slightly above zero psig to 15 psig. Therefore, for purposes of this invention, what is meant by "low to medium pressure" are pressures in the range of slightly above zero psig to 15 psig, and what is meant by "high temperatures" are temperatures in the range of 1800° F. to 2800° F.

One of the most egregious forms of inefficiency in heat exchangers occurs in the connections of the tubes to the tube sheets, wherein leakage is usually of a high volume. Further, these prior art connections are machined to decrease the tolerances and to prevent high leakage and this adds to the overall cost of such systems. In addition, the tube sheet itself is subject to expansion and when it expands, it expands in an uncontrolled manner which causes the tube sheet to move out of alignment, and thus causing more leakage. The prior art tube sheets also have a problem in that the tiles are manufactured such that they contain only one half of a tube opening in them and thus, that means many tube tiles have to be mortared together to obtain a tube sheet. Since these mortared joints microcrack under operating conditions, the more mortar joints that are used in a heat exchanger, the more leaks that occur in the tube sheets.

The heat exchangers of the prior art that are subject to many of the problems set forth above can be found in one or more of the following patents: U.S. Pat. No. 1,429,149, U.S. Pat. No. 1,974, ,402, U.S. Pat. No. 3,019,000, U.S. Pat. No. 3,675,710, U.S. Pat. No. 3,923,314, U.S. Pat. No. 4,018,209, U.S. Pat. No. 4,106,556, U.S. Pat. No. 4,122,894, U.S. Pat. No. 4,449,575, and U.S. Pat. No. 4,632,181, and the United Kingdom patents, 191,175, issued in January, 1923, and 2,015,146, issued in September of 1979.

One notable publication dealing with a flexible ball joint system for joining ceramic heat exchanger tubes to tube sheets is that entitled "FLEXIBLE BALL JOINT SYSTEM", dated Apr. 11, 1995 in which there is shown a flexible ball joint system sold by Sonic Environmental Systems, Inc. wherein there is shown in an exploded view, a plug, a ball seal, a collar and a ceramic tube. This assembly has a slip surface between the tube and the ball seal. When the tube slides in and out of the seal due to thermal expansion, it does not pull the ball seal against the inner surface of the inner tube sheet tile or the ceramic tube. This results in a situation in which, when the tube sheets move during operation, the ball seals d not maintain their compression and leakage occurs. Further, without an attachment to the ceramic tube, the seal cannot move, either in a linear direction, or a lateral direction, both of which are requirements in a good sealing system.

Thus, there is needed a decidedly different heat exchanger to overcome the problems set forth above.

THE INVENTION

The invention disclosed and claimed herein deals with low to medium pressure, high temperature, all ceramic, air-to-air, indirect heat exchangers, novel ball joints and connecting slip ring collars for ceramic tubes that are useful in such heat exchangers, and systems comprising several heat exchangers or systems comprising heat exchangers that are fabricated such that they provide more efficient heat exchangers then has been possible heretofore.

More specifically, this invention deals in one embodiment with a low to medium pressure, high temperature, all-ceramic, air-to-air, indirect heat exchanger which comprises in combination (A) a novel, all-ceramic ball joint, said ball joint comprising a spherical body having an outer surface and an inner surface and having a near side and a tube side. The near side has a truncated face to form a flat surface on the near side. The spherical body has a first opening through it from the near side through the tube side. The tube side has a truncated face to form a flat surface on the tube side and the tube side has a second opening in alignment with and larger than the first opening to form a shoulder within the second opening which accommodates a ceramic tube in it. The outer surface of the spherical body is covered with a smooth, refractory ceramified, frit glaze.

(B) is an assembly comprising: (i) a tile; (ii) a closure ring; (iii) a plug, and (iv), at least one friable, crushable, alignment ring, wherein parts (i), (ii), and (iii) are ceramic bodies and wherein part (i) is a tile which forms part of a tube sheet. The tile has at least one round opening through it and has a plug side and a tube side and an inside surface. The tile has a discontinuous annular ring on the interior surface formed by the opening and near the plug side.

Part (ii) is a closure ring having a length essentially one-half of the width of the tile and it has a top surface, a bottom surface, a near end and a distal end wherein the top surface is bonded to the interior surface of the tile near the tube side of the tile such that the distal end of (ii) is essentially vertically aligned with the tube side of the tile. The part (ii) has an arcuate notch in the near end and in the interior surface. The arcuate notch is covered with a coating of a smooth, refractory ceramified frit glaze and mates with the spherical body outer surface.

Part (iii) is a plug. The plug has a plug top surface, a plug interior surface, a plug near end, a plug distal end, an opening through its center, and a horizontal midpoint, there is a discontinuous channel in the plug top surface to accommodate the discontinuous annular ring of the tile. The plug has a second arcuate note in the plug near end and in the plug interior surface. The second arcuate notch is covered with a smooth, refractory ceramified frit glaze and mates with the spherical body outer surface. The plug has a curved face at its distal end which begins at the plug interior surface and near the horizontal midpoint and ends at the plug distal end near the top surface. The closure ring and the plug provide a channelled opening between them at their near ends.

Part (iv) is a friable, crushable, alignment ring. The alignment ring is located in the channelled opening and Part C. are multiple ceramic heat exchanger tubes fitted with B. as set forth above.

Another embodiment of this invention is a heat exchanger as set forth just above, wherein, in addition, the ceramic tubes are fitted with B. on one end, and their opposite ends are connected together in an end to end configuration with a like-fitted ceramic tube using an all-ceramic connecting slip ring collar.

The ceramic tubes have an outside surface and the connecting slip ring collar has an outside surface and an inside surface. The connecting slip ring collar has an inside diameter such that the inside surface of the connecting slip ring collar is adaptable to and conforms with the outside surfaces of the ceramic tubes such that the connecting slip ring collar is closely, slidably mated with each of the ceramic tubes and supports such tubes. There is located within the connecting slip ring collar, and situated between the ends of the ceramic tubes, a friable, crushable, ceramifiable ring.

Still another embodiment of this invention is a novel, all-ceramic ball joint, said ball joint comprising a spherical body having an outer surface and an inner surface and having a near side and a tube side. The near side has a truncated face to form a flat surface on the near side. The spherical body has a first opening through it from the near side through the tube side and the tube side has a truncated face to form a flat surface on the tube side. The tube side has a second opening in alignment with and larger than the first opening to form a shoulder within the second opening to accommodate a ceramic tube in it. The outer surface of the spherical body is covered with a smooth, refractory ceramified, frit glaze.

Yet another embodiment of this invention is a novel all-ceramic ball joint assembly comprising the ball joint discussed supra in combination with (i) a tile; (ii) a closure ring; (iii) a plug, and (iv) at least one friable, crushable, alignment ring.

Further embodiments of this invention are a novel closure ring, a novel plug, and a novel alignment ring, all of which are useful in an all-ceramic ball joint assembly used in a unitary, ceramic tile.

BRIEF DESCRIPTION OF THE DRAWINGS

FIG. 3 is an enlarged view in perspective of a portion of the ceramic tube arrangement of the heat exchanger 10 of FIG. 2.

FIG. 4 shows a representative tube tile of this invention having five holes.

FIG. 5 shows an arrangement of tube tiles to form a portion of a tube sheet of this invention.

FIG. 9 is an enlarged cross sectional view of a portion of the baffle wall and connector slip rings taken through line 100—100 of FIG. 3.

FIG. 10 is a cross sectional full side view of another embodiment of the connector slip ring assembly which is mounted on one side of the baffle wall taken through line 500—500 of FIG. 3.

FIG. 11 is an end view of a ceramic tube of this invention with a re-radiator bar contained therein.

DETAILED DESCRIPTION OF THE DRAWINGS

Figure 1:
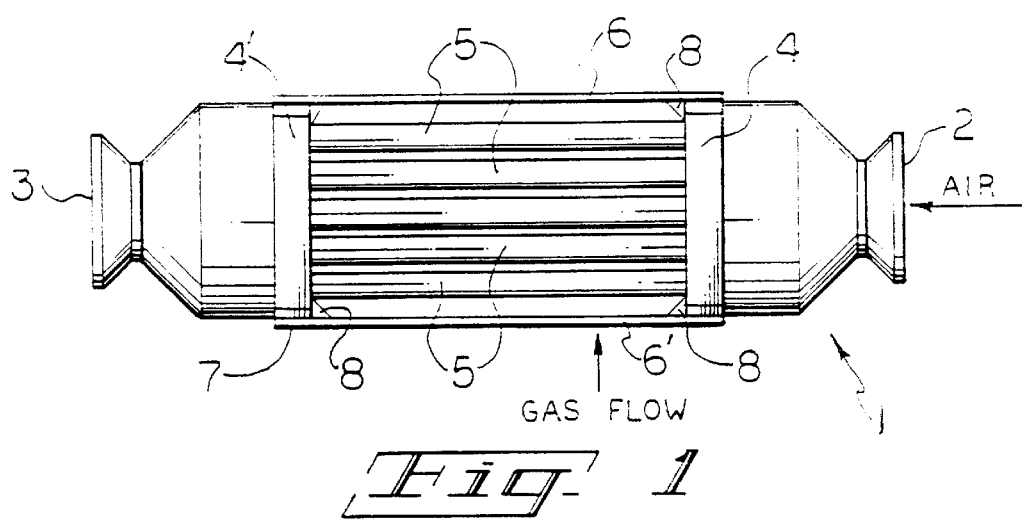
FIG. 1 is a full top view of a portion of one of the heat exchangers of this invention with the top shell wall removed to show the interior of the heat exchanger.

Turning now to the Figures, there is shown in FIG. 1 a full top view of a portion of one of the heat exchangers 1 of this invention with the top shell wall removed, wherein there is shown generally, an inlet plenum 2 for introducing forced air into the tube end of the heat exchanger and an outlet plenum 3 for removing the forced air from the heat exchanger 1, tube sheets 4 and 4' which support the ends 9 (shown in the FIG. 3) of the ceramic tubes 5. There is also shown the two sides 6 and 6' of the shell 7, which make up the outer walls of the housing of the heat exchanger 1. Also shown in FIG. 1 are the connections 8 which are non-heat conductive attachments of the shell 7 to the tube sheet and which prevent the shell 7 from obtaining high heat by conduction. These connections 8 consist of constructing a channel frame about six inches from the main shell, in conjunction with the use of high alumina, dense refractory tile between the channel frame and the edge of the conventional tube sheet. In this manner, width is added to the tube sheet. The outer construction is then finished with a low K-factor refractory. The combination of the additional thickness owing to the extension of the tube sheet, with the low K-factor reduces the heat temperature sufficiently to permit a metal shell, strong enough to hold the tube sheet in place. Thus, no air cooling is required in such a heat exchanger as there is in prior art heat exchangers. It should be noted that the total housing and the plenums for controlling the hot gases are not shown in these Figures as they do not lend themselves to a clear description of the essence of this invention. This Figure of the invention shows the most fundamental embodiment of the heat exchanger 1.

Figure 2:
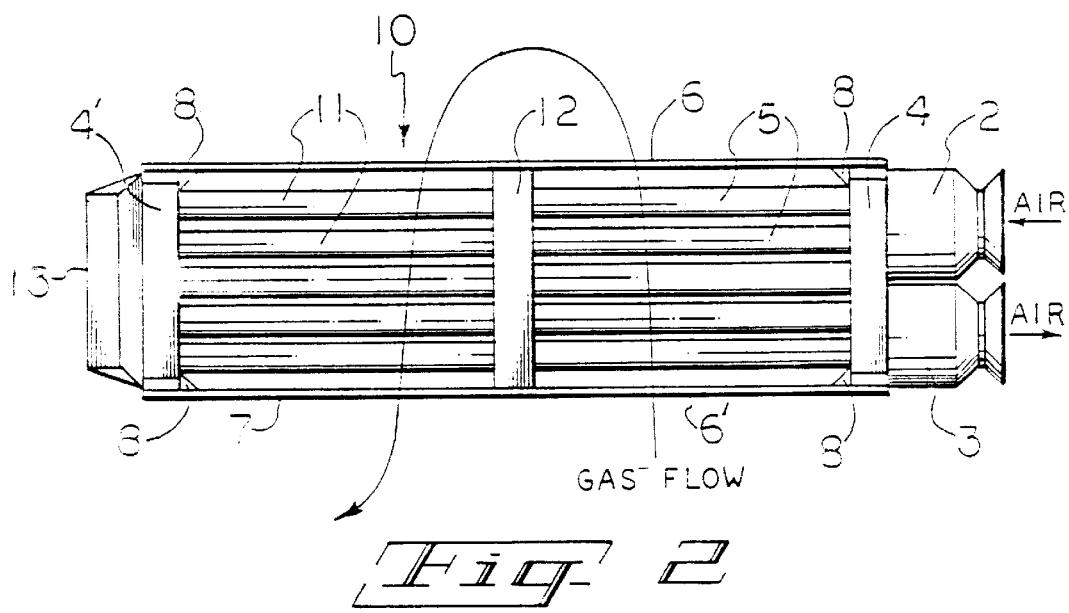
FIG. 2 is a full top view of a portion of one of the heat exchangers of this invention with the top shell wall removed to show the interior of the heat exchanger. This figure shows two of the heat exchangers connected together in a linear series through the use of a baffle wall.

A portion of a more complex, but highly efficient heat exchanger 10 is shown in FIG. 2. Thus, there is shown the inlet plenum 2 for carrying forced clean air into the ceramic tubes 5. It should be noted that the outlet plenum 3 for removing the heated, forced clean air is located adjacent the inlet plenum 2, the reason for which will be abundantly clear upon further discussion infra. There is also shown the tube sheets 4 and 4', the ceramic tubes 5, the two sides 6 and 6' and the connectors 8.

In addition, the heat exchanger 10 also has an extra set of ceramic tubes designated 11, which are essentially equivalent to ceramic tubes 5, but are designated 11 in order to help clarify this invention, and a baffle wall 12, which is not a tube sheet. Finally, the heat exchanger 10 has a capping plenum 13 at the end of the heat exchanger 10 opposite the inlet plenum 2 and outlet plenum 3 to turn the hot clean air from the first set of ceramic tubes on the inlet side to the second set of ceramic tubes on the outlet side. It should be noted for those skilled in the art that the heat exchangers of this invention can handle the reverse order of passage of the air and gas. Thus, with reference to FIG. 2, where it is indicated "Air" on the right hand plenum of that Figure, the gas flow can be moved through these plenums, and the air can be moved according to the flow illustrated by "GAS FLOW" in FIG. 2 without creating excessive deterioration of the heat exchanger.

Figure 8:
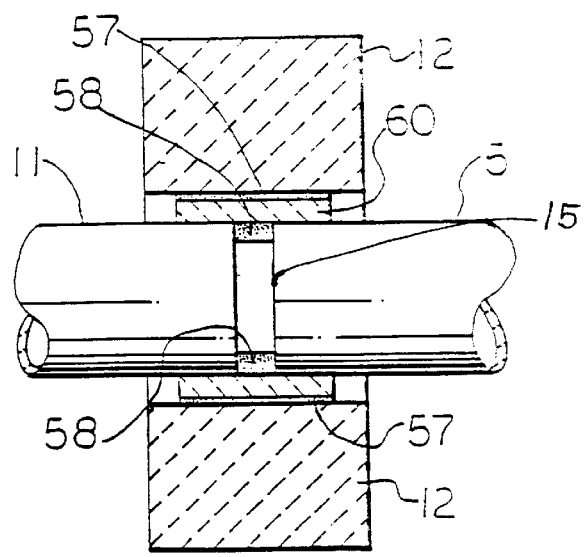
FIG. 8 is a cross sectional view of a connector slip ring assembly taken through line 400—400 of FIG. 3.

The baffle wall 12 is designed to support the ends of the ceramic tubes 5 (and 11 where used), within a connecting slip ring 60, shown in FIGS. 8, 9, and 10 in more detail, but not visible in FIG. 2. The significance of the connecting slip ring 60 becomes more apparent when reference is made to FIG. 10, wherein an enlarged view of the connecting slip ring 60 is shown. This slip ring becomes important because the ceramic tubes being held by the connecting slip ring 60 can be removed when the connecting slip ring 60 is advanced on the ceramic tube 5 such that the connecting slip ring 60 and the ceramic tube 5 can be lifted out of alignment with the ceramic tube 11, and moreover, the assembly created by the connecting slip ring 60 and the ceramic tube 5 can be lifted from the baffle wall 12 for removal of the ceramic tube 5 for replacement or repair. This construction allows for the tubes (and the heat exchanger) to be repaired or maintained without having to remove the plugs from the tube sheet 4, that is, the heat exchanger can be repaired from the interior of the heat exchanger without having to deal with the tube sheet 4. Thus, it is contemplated within the scope of this invention to provide a tube sheet which does not require the plugs 21 as it would not necessarily require that the ceramic tubes 5 need to be removed from the heat exchanger through the plug openings. The baffle wall 12 also helps define the zones for the hot gases that are passed over the ceramic tubes 5, it being noted that the hot gases move essentially in a perpendicular direction to the flow of the clean air through the ceramic tubes 5. It should be noted by those skilled in the art that the ceramic tubes of this invention are manufactured by standard slip cast or extruded methods, and do not require internal or external machining or special end dressing of the ceramic tube diameter as is required in the prior art ceramic tubes.

Turning now to FIG. 3, there is shown an enlarged view in perspective of a portion of the ceramic tube arrangement including a tube sheet 4', a baffle wall 12, and the ceramic tubes 11 of the heat exchanger 10 of FIG. 2.

As noted above, the ceramic tubes 11 are supported and held by their ends 9 (shown in FIG. 3) in the tube sheet 4' (shown at the left end of the Figure) with a novel ball joint assembly which will be discussed in detail infra. The opposite ends 15 of the ceramic tubes 11 (shown in FIG. 8) are inserted into and supported by the baffle wall 12 by the use of a novel connecting slip ring 60, shown in detail in FIG. 8. Thus, the ceramic tubes 11, and the ceramic tubes 5 (FIG. 2) are aligned end to end within the connecting slip ring 60 within the baffle wall 12, the detail of which can be found in the description below dealing with the connecting slip ring 60 and also in FIGS. 9 and 10.

Also shown in the front surface 16 of the tube sheet 4' are the plugs 21 which also are discussed in detail infra.

Moving on to the consideration of FIG. 5, there is shown a portion of a tube sheet 4'. Since in most respects the tube sheets, including tube sheets 4 and 4' are essentially the same, the description of tube sheet 4' can suffice to describe all tube sheets used in the fabrication of the low to medium pressure heat exchangers of this invention. For purposes of this discussion, and with reference to FIG. 4, there is shown a novel tube tile 17. It should be understood that the tube tiles 17 of this invention are novel because they have a novel, highly useful configuration and this allows for the low cost manufacturing of such tiles. The tube tiles 17 of the instant invention are made in a unitary construction by pressing the tube tile in a ram press without making fine threads, it being one object of this invention to eliminate the fine threads which are costly to cast into the piece. However, it should be noted that the tube tiles of this invention retain all of the plug locking potential that is required to hold the low to medium pressures of the heat exchangers of this invention. The prior art tube tiles have to be side rammed to get the fine threads into the surface. Further, the tube tiles of this invention, used with a rammed plug, and because of their unitary construction are stronger than the prior art tiles. Prior art tiles that use a cast plug and more shapes per assembly are of a two piece construction, that is, they are made in two halves to accommodate the aforementioned casting of the fine threads, and then they are cemented together to make a whole tube tile generally containing either one or two holes for the ceramic tubes. The fact that they have to be cemented together creates an additional problem because of the microcracking during operation of the heat exchanger, that takes place in the cement joints that hold the tube tile together. Such microcracking creates a site for leakage. The tube tiles of this invention are a nominal size of two inches thick by eight inches long, but can vary from this size within reason.

Thus, the tube tiles 17 of this invention are unitary in construction and have one or more holes 18 through them. The number of holes 18 will depend on the desired construction of the particular heat exchanger that one desires to fabricate, but the tube tiles 17 have been fabricated by the inventor herein with up to seven holes 18 in a single tube tile 17. Most importantly, one can make a single tile with up to seven tube holes. This reduces the number of mortar joints by about 90%. That reduction, in turn, reduces leakage and cost of assembly. In addition, the holes can be held to a more accurate tolerance when there is not a mortar seam on each side. Shown in FIG. 4 is a tube tile 17 having five holes 18. It should be noted that the holes 18 are press fabricated with tabs 19 which are located on the interior surface 20 of the holes 18 such that they form a discontinuous annular ring within the hole 18 and on the interior surface 20. The discontinuous annular ring configuration is one-half of a Luer Lock$^R$ mechanism for locking a plug 21 (shown in FIGS. 6 and 7) into the hole 18. The tabs 19 are located in the hole 18 such that they act as a coarse threaded configuration which allows the plug 21 to be locked into the hole 18, but also to allow for a slight tightening of the plug 21 into the hole 18 without having to resort to fine threads such as are used in prior art tube tiles. The pressed tube tiles and plugs of the instant invention have five times the crush strength of prior art castable tube tiles and plugs. The tube tiles 17, along with other configurations of the tube tiles 17 are used to fabricate tube sheets 4 and 4'. Thus, turning again to FIG. 5, there is shown an arrangement of tube tiles 17 to form a tube sheet such as 4 or 4' of this invention. It should be noted by those skilled in the art that no attempt was made in FIG. 5 to show a fully completed tube sheet such as 4 or 4', but rather to show how the tube tiles 17 can be arranged with regard to each other. Note for example the tiles 22 and 23 which are spacer tiles and are used to help configure the tube sheet 4 or 4'. It is desired that the tube sheets 4 and 4' have essentially a rectangular configuration, but square configurations can be used, and thus it is necessary that other configurations of the tube tile, some with holes 18 and some without, are needed to construct such tube sheets. Further, eventhough the tube tiles 17 are shown in one configuration does not mean that the invention is limited to just that configuration. It is contemplated within the scope of this invention to combine various configurations of tube tiles 17 to arrive at tube sheets useful in this invention.

It should also be noted that the tube tiles such as 17, 22 and 23 are cemented together at cement joints 24 to form the tube sheets such as 4 and 4'. By virtue of the use of the unique tube tiles 17 of this invention, the tube sheets such as 4 and 4' have far less cemented joints 24, and therefore, the tube sheets such as 4 and 4' have significantly less leakage, in some instances, the inventor herein has observed up to ninety percent less leakage with such an arrangement.

Figure 6:
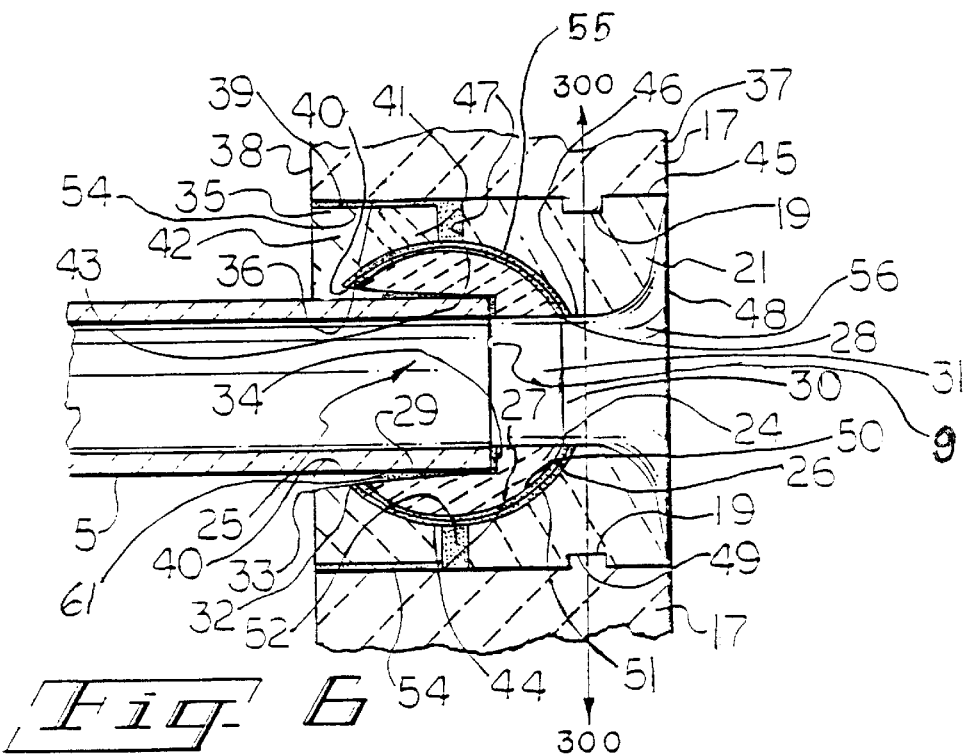
FIG. 6 is a cross sectional side view of the ball joint assembly taken through line 200—200 of FIG. 3.

Turning now to FIG. 6, and the novel ball joint assembly 25 of this invention, there is shown a cross-section of a portion of the tube sheet 4', of FIG. 3, through the points 200—200.

With reference to FIG. 6, there is shown a tube tile 17 of this invention which is holding the ball joint assembly 25. The ball joint assembly 25 is comprised of a spherical body 24 having an outer surface 26 and an inner surface 27 and a near side 28, and a tube side 29. The near side 28 has a truncated face 30 to form a flat surface. The spherical body 24 has a first opening 31 through it from the near side 28, which extends through the tube side 29. The tube side 29 also has a truncated face 32 to form a flat surface on the tube side 29. The tube side 29 has a second opening 33 in alignment with and larger than the first opening 32 to form a shoulder 34 within the second opening 33 to accommodate a ceramic tube 5 therein. In addition, the outer surface 26 of the spherical body 24 has adhered-to and is covered with a smooth, refractory ceramified, frit glaze 55.

Also with reference to FIG. 6, there is shown a closure ring 35 wherein the closure ring 35 has a width essentially one-half of the length of the tube tile 17. The tube tile 17 has a bottom surface 36, a plug side 37, and a tube side 38. The closure ring 35 has a top surface 39, a bottom surface 40, a near end 41, and a distal end 42 and the inside diameter of the opening of the ring approximates the outside diameter of the ceramic tubes 5 that are used in the fabrication of the heat exchanger. The top surface 39 is intended to be cemented to the bottom surface 36 of the tube tile 17, near the tube side 29 of the tube tile 17 such that the distal end 42 of the closure ring 35 is essentially vertically aligned with the tube side 29 of the tube tile 17. The cemented interfaces are shown at 54. The closure ring 35 has an arcuate notch 43 in the near end 41 and at the bottom surface 40. The arcuate notch 43 is covered with, and has adhered thereto, a smooth, refractory ceramified frit glaze 44 intended to be mated with the outer surface 26 of the spherical body 24 contained in the ball joint 25.

Figure 7:
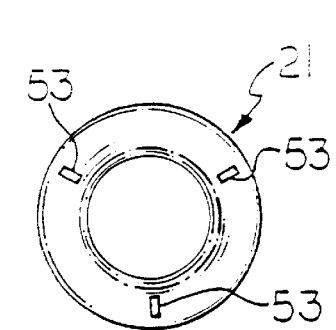
FIG. 7 is a full front view of a plug of the ball joint assembly.

Also associated with the ball joint assembly 25 is a plug 21, shown in FIG. 6 which is also shown in a full front view in FIG. 7.

The plug 21 has a top surface 45, a bottom surface 46, a near end 47, a distal end 48, and a vertical midpoint shown as line 300—300. The plug 21 has a discontinuous annular channel 49 in its top surface 45 to accommodate the discontinuous annular ring formed by the tabs 19 of the tube tile 17. The plug 21 has a second arcuate notch 50 in the near end 47 and at the bottom surface 46, the second arcuate notch 50 having adhered-to and being coated with a refractory ceramified frit glaze 51. This coated arcuate notch 50 is intended to mate with the all-ceramic, ball joint outer surface 26. The plug 21 has a curved face at its distal end 48 which begins at the bottom surface 46 and near the vertical midpoint shown by line 300—300 and ends at the distal end 48 near the top surface 45. The plug 21 has an opening 56 through it which has an inside diameter approximating the inside diameter of the spherical body 24. As indicated supra, the plugs of this invention are obtained by ram pressing rather than by casting.

Situated in the interfacial space between the closure ring 35 and the plug 21 is at least one alignment ring 52, which alignment ring 52 is fabricated from a friable, crushable ceramifiable ceramic material. This alignment ring 52 is ceramified during the first heat up of the heat exchanger.

Shown in FIG. 7 is a full front view of a plug 21 according to this invention, showing the indentions 53 that are fabricated in the face of the plug 21, in order to be able to grip the plug 21 for turning in and out of the tube tile 17 during repair, maintenance, assembling and disassembling. The indentions 53 can have any configuration that will allow a wrench, or some similar instrument to be inserted for the purpose of turning plug 21 in either direction.

With regard to the novel expansion assembly of the invention and turning now to FIGS. 8 and 9, there is shown in FIG. 8, a cross sectional view through line 100—100 of FIG. 3, showing a portion of the baffle wall 12 and the ceramic pipes 5 and 11 and the novel connector slip ring 60 along with a friable, crushable, ceramic gasket ring 58. FIG. 9 is a cross sectional side view of a larger portion of the baffle wall 12 through line 400—400 showing several connector slip rings 60 cemented in place at cement lines 57.

FIG. 10 is another embodiment of the configuration of the connector slip ring 60 mounting which is outside of the baffle wall 12, but is still supported by the baffle wall 12.

Finally, with reference to FIG. 11, the inventor contemplates that the ceramic tubes 5 of this invention can contain a re-radiator bar 59 in those cases where it is required to maintain heat in the system. Re-radiator bars 59 are well-known to those skilled in the art and detailed information is not required herein regarding their composition, use and their assembly in the ceramic tubes. A lip 62 is shown in phantom in FIG. 11, which lip serves to prevent the re-radiator bar from moving out of the tube.

Now, bringing all of these parts together so that those skilled in the art can appreciate the high level of novelty of this invention it should be noted that in the fabrication of the heat exchanger, tube tiles 17 are cemented together to form the desired configuration to accommodate the ceramic tubes 5, generally in a round, square or rectangular configuration.

As indicated supra, the fabrication of the tube sheets 4' should not be lightly undertaken, as tube sheets 4' fabricated without paying attention to detail can result in extensive leakage. The tube tiles 17 of this invention allows fabrication of tube sheets in just about any configuration by using tube tiles 17 that can have up to seven holes in them. Prior art tube tiles usually contained only one or two holes in them, with a full mortar joint through every thread, which means that tube sheets had a lot of mortar joints in them, which joints microcrack during use, and which thus, leads to extensive leakage through the tube sheet. Since the tube tiles 17 of this invention provide many holes 18, with no mortar joints through the threads, and since the tube tiles 17 are of a unitary construction, less mortar joints need be used in the construction of the tube sheets 4', and hence, there is significantly less leakage. This fact is especially crucial when the heat exchangers of this invention are subjected to high temperature and medium pressures. Moreover, the tube tiles 17 of this invention lead to less costly construction of the tube sheets.

Ball joint assemblies 25 are then used to construct the tube sheets 4', that is, the bundle of ceramic tubes 5 that will constitute the heat exchanging portion of the heat exchanger, by cementing, using mortar 61, one end of a ceramic tube 5 into the tube side 29 of a spherical body 24 of the ball joint assembly 25. In each of the holes 18 of the tube sheet 4, a closure ring 35 is inserted such that its distal end 42 is in vertical alignment with the tube side 38 of the tube tile 17. The closure ring 35 is cemented at its top surface 39 to the interior surface 27 of the tube tile 17. The end 15 of the ceramic tube 5 which does not have the spherical body 24 cemented on it is passed through the center of the closure ring 35 and the tube side 29 of the spherical body 24 is drawn up against the arcuate notch 43 in the interior surface 40 of the closure ring 35. The alignment ring 52 is then placed up against the closure ring 35 near end 41, and around the spherical body 24, the plug 21 is inserted into the opening 18 in the plug side 37 of the tube tile 17, and the plug 21 is turned to compress the alignment ring 52, and seat and lock the plug 21 into place.

It should be noted that the interior surface 40 of the closure ring 35 is beveled in a line from near its near end 41 to the distal end 42 thereof. This angle of bevel is on the order of about 20° to about 60° from a plane formed by the outside surface of the ceramic tube 5 placed therein, the actual angle being determined by the size of the spherical body 24 and the length of the ceramic pipe 5, from its contact with the spherical body 24 to the distal end 42 of the closure ring. The purpose of this bevel is to allow for the ceramic pipe 5 to move out of alignment and swivel to a limited degree during operation, as the ceramic parts of the assembly expand due to heating. This slight swivel effect allows a good seal to be retained on the ceramic tube 5, while preventing a fracture of the ceramic pipe 5 due to shear stress on it.

Because the closure ring 35 is cemented to the interior of the tube tile 17, and because the ceramic tube 5 is cemented to the spherical body 24, the ceramic tube 5 cannot move out of the tube sheet 4', but can move to alleviate stress on the ceramic tube 5, all the while keeping a positive seal on the closure ring 35 to prevent leakage.

As noted above, the face of the spherical body 24 and the faces of the arcuate notches 43 and 50 in the interior surfaces of the closure ring 35 and the plug 21 are coated with a smooth, refractory ceramified glaze which gives a good positive seal, but allows for the smooth rotation of the spherical body 24 within the notches 43 and 50 during heating up and cooling down of the apparatus. Such a coating is durable at the high temperatures used in the heat exchanger and thus, replacement of gaskets normally used in this part are not required resulting in less down time for the heat exchanger.

Dense, high temperature refractory is difficult and expensive to machine. The refractory frit ceramified glaze gives a machined surface to conventionally manufactured ceramic shapes.

The discontinuous annular ring on the interior of the tube tile 17 works in combination with the discontinuous annular channel 49 in the outside surface of the plug 21 to provide a Luer Lock$^R$ type of mechanism that draws the plug 21 in to compress the friable, crushable alignment ring 52 between the near ends 41 and 47 of the closure ring 35 and plug 21. This alignment ring 52 not only allows for good alignment of the ceramic parts, but it also acts as a gasket between the parts so as to help reduce leakage through the tube tiles 17 and into the interior of the heat exchanger. Furthermore, if some maintenance has to be undertaken with a ceramic tube 5, the removal of the plug 21 and the ceramic tube 5 may not require another alignment ring 52, as the alignment ring 52 is crushed in the process of expansion during heating, and the alignment ring 52 takes on the configuration of the parts and allows for the parts to be conveniently re-assembled with the expectation that the parts will continue to provide a good, positive seal against leakage. Such flexibility in the use of material drives down the cost of the operation of such a unit.

If one desires to fabricate rust a one pass unit, or a small unit as shown in FIG. 1, then the opposite end of the ceramic tube 5 is treated just as is the first end. The heat exchanger then can be provided with the appropriate housing, plenums, fans, and the like to operate the unit.

Figure 12:
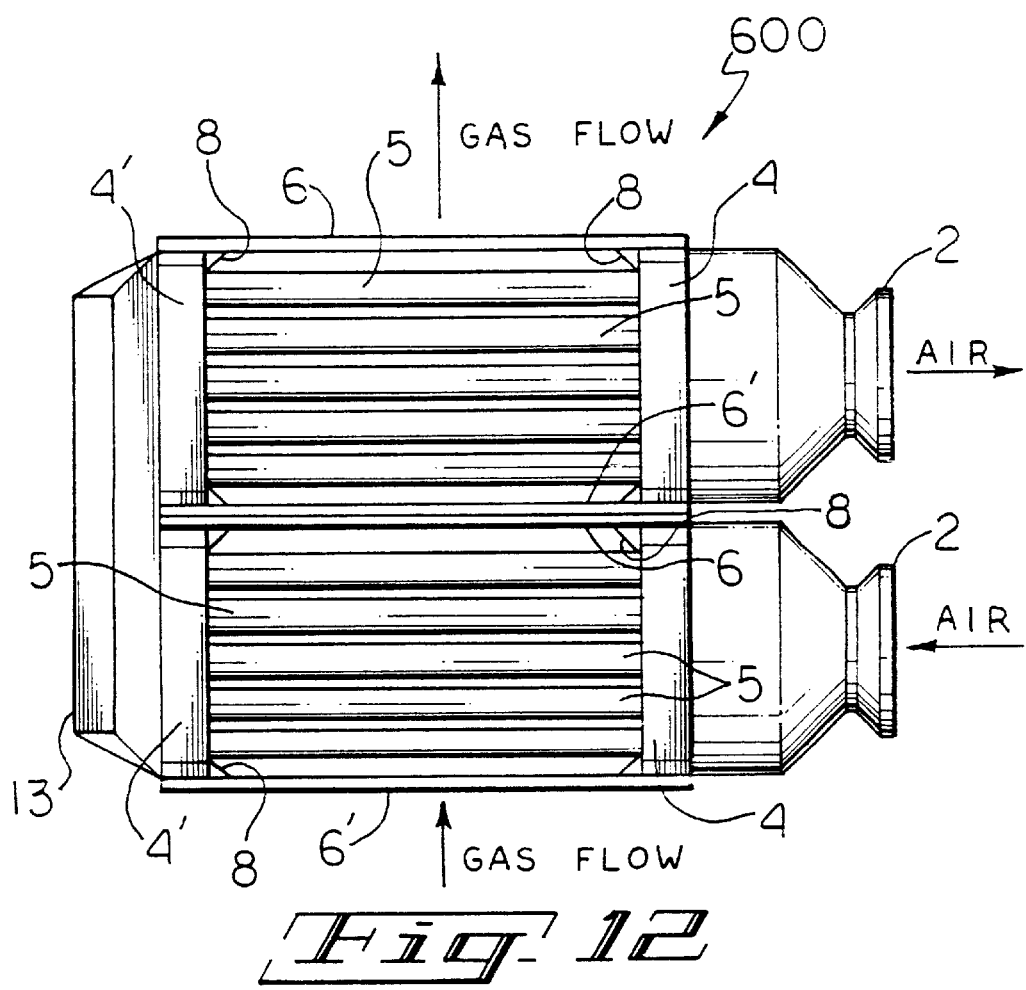
FIG. 12 is a full side view of two heat exchangers of this invention connected together in linear series.

However, if one desires to increase the efficiency of such a unit and provide lower cost operation at high temperatures and low to medium pressures, then one would need to construct a unit based on that shown in either FIG. 2 or FIG. 12 (unit 600), wherein the reference numbers have the same meanings as in the other Figures.

The heat exchanger 10 shown in that Figure is even more novel in that there is used a baffle wall 12 and a novel means of allowing for expansion of the ceramic tubes 5 in the heat exchanger that is unknown to those skilled in the art.

The unit is constructed in a fashion similar to that described above, but, however, after the first tube sheet 4' is constructed and the novel ball assemblies 25 are in place, a second tube sheet 4 is constructed essentially identically to the first tube sheet 4' and then the two tube sheet assemblies are matched end to end on the ends that do not have any ball joint assembly 25. These matching ends are secured by inserting connector slip rings 60 into the holes 18 of a baffle 12 and then inserting the ends 15 of the ceramic tubes 5 and 11 into the connector slip rings 60 such that they do not meet each other inside the connector slip rings 60. Prior to insertion of the rings, there is inserted into the connector slip rings 60, an alignment ring 58, similar to that used in the novel ball joint assembly 25. The connector slip rings 60 are designed such that they mate with the interior surface 20 of the holes 18 in the baffle wall 12, and are cemented therein. The connector slip rings 60 have an inside diameter such that the ceramic tubes 5 and 11 will easily slip inside them, and upon heating, the ceramic tubes 5 and 11 expand to mate with the inside surface 20 of the connector slip rings 60, but will be slidable therein. Further, this design of the connector slip rings 60 through the baffle wall 12 allows for the linear expansion of the ceramic tubes 5 and 11, which expansion will push the ceramic tubes 5 and 11 into the connector slip rings 60, and crush the alignment ring 58 therein. The ceramic tubes 5 and 11 thus will not expand greatly towards the ends that are secured by the novel ball joint assemblies 25 and by this means, a positive seal is maintained on the tube sheets 4 and 4', and the connector slip ring assemblies 60, further reducing the possibility of leakage in the system. In this type of design, all of the take-up for ceramic tube expansion is now in the connector slip ring 60. This means the seal in the 5 tube sheets 4 and 4' only have to allow for tube to tube sheet movement and does not have to allow for tube expansion in length.

As the tube expands, it will grow towards the connector slip ring 60. This means the leakage on the pan seal, if any will be constant regardless of temperature.

Since the prior art ball joint device has a sliding ceramic tube inside the ball, the tube will not pull the ball against the seal and therefore, there is not a positive seal and heat exchangers provided with the prior ball joint assembly will not have the reduced leakage of the instant invention.

It should be noted at this point, for those skilled in the art, that a further embodiment of this aspect of the invention such as shown in FIG. 10 can be utilized. This embodiment shows the connector slip ring 60 being supported by the baffle wall 12, but its placement is on the outside of the wall such that the assembly is on the cooler side of the baffle wall 12 as opposed to the hotter side of the baffle wall 12. The connector slip ring 60 is cemented to the baffle wall 12 only at 57, while the connector slip ring 60 is not cemented any place else and this allows the connector slip ring 60 to be held tightly to the baffle wall 12 for support in the coldest side, thereby reducing the deterioration of the parts on that side. By putting the ceramic tubes 5 and 11 in line in this manner and connecting the "coldest" tube to the "hottest" tube at the inlet and the outlet, respectively, and the medium temperature tubes connected to each other, one ends up with the opposing tube sheets 4 and 4' staying vertical as they expand.

It should be noted that the use of the connector slip rings 60 allows the replacement of one ceramic tube 5 or 11 without requiring the replacement of the companion connecting tube.

In prior art designs, the top row of ceramic tubes are colder than the bottom row of ceramic tube, so the tube sheets have a tendency to move apart at the bottom and stay closer together at the top. This created a tee pee effect and increased leakage.

Further, by connecting the ceramic tubes in the center with a connector slip ring that is cemented to one tube and free sliding at the other end and connecting the tubes in a line, a two-pass exchanger that has four tube sheets becomes a two-pass exchanger with two tube sheets and the center wall, which is the baffle wall 12 acts as a baffle and, since it is in the heat exchanger proper, it is not subject to leakage from the air side of the heat exchanger.

It should be understood by those skilled in the art that several such heat exchangers can be hooked together to form a system.

What I claim is:

1. A closure ring useful in an all-ceramic ball joint assembly used in a unitary, ceramic tube tile, said closure ring having a width essentially one-half of the length of the tube tile which tube tile has a bottom surface, a plug side, and a tube side, said closure ring having a top surface, a bottom surface, a near end and a distal end wherein the top surface is intended to be cemented to the bottom surface of the tube tile near the tube side of the tube tile such that the distal end of the closure ring is essentially vertically aligned with the tube side of the tube tile, said closure ring has an arcuate notch in the near end and at the bottom thereof, said arcuate notch being covered with a coating of a smooth, refractory ceramified frit glaze intended to be mated with the outer surface of a spherical body contained in a ball joint.

2. A plug, said plug having a top surface, a bottom surface, a near end, a distal end and a horizontal midpoint, there being a discontinuous channel in said top surface intended to accommodate a discontinuous annular ring of any all-ceramic tile being used therewith; said plug having a second arcuate notch in the near end and at the bottom thereof, said second arcuate notch being covered with a smooth, refractory ceramified frit glaze intended to mate with an all-ceramic ball joint outer surface, said plug having a curved face at its distal end which begins at the bottom surface and near the horizontal midpoint and ends at the near end near the top surface.

3. An all-ceramic connecting slip ring collar for use in slidably connecting ceramic tubes in an all-ceramic, air-to-air, indirect heat exchanger, said ceramic tubes having an outside surface, said connecting slip ring collar having an inside surface, said connecting slip ring collar having an inside diameter such that the inside surface of the connecting slip ring collar is adaptable to and conforms with the outside surfaces of the ceramic tubes such that the connecting slip ring collar is closely, slidably mated with each of the ceramic tubes and supports such tubes.

* * * * *